US009895680B2

(12) United States Patent
McGuire, Jr. et al.

(10) Patent No.: US 9,895,680 B2
(45) Date of Patent: *Feb. 20, 2018

(54) FCC CATALYST COMPOSITIONS CONTAINING BORON OXIDE

(71) Applicant: BASF Corporation, Florham Park, NJ (US)

(72) Inventors: Robert McGuire, Jr., Nanuet, NY (US); Gary M. Smith, Verona, NJ (US); Bilge Yilmaz, New York, NY (US)

(73) Assignee: BASF CORPORATION, Florham Park, NJ (US)

(*) Notice: Subject to any disclaimer, the term of this patent is extended or adjusted under 35 U.S.C. 154(b) by 414 days.

This patent is subject to a terminal disclaimer.

(21) Appl. No.: 14/134,614

(22) Filed: Dec. 19, 2013

(65) Prior Publication Data

US 2015/0174560 A1 Jun. 25, 2015

(51) Int. Cl.
| | |
|---|---|
| B01J 29/06 | (2006.01) |
| C10G 11/05 | (2006.01) |
| B01J 29/08 | (2006.01) |
| C10G 11/04 | (2006.01) |
| C10G 11/18 | (2006.01) |
| B01J 37/04 | (2006.01) |
| B01J 35/00 | (2006.01) |
| B01J 21/02 | (2006.01) |
| B01J 21/04 | (2006.01) |
| B01J 21/16 | (2006.01) |
| B01J 23/755 | (2006.01) |
| B01J 37/00 | (2006.01) |
| B01J 37/02 | (2006.01) |

(52) U.S. Cl.
CPC ............ *B01J 29/088* (2013.01); *B01J 21/02* (2013.01); *B01J 21/04* (2013.01); *B01J 21/16* (2013.01); *B01J 23/755* (2013.01); *B01J 35/0006* (2013.01); *B01J 37/0009* (2013.01); *B01J 37/0045* (2013.01); *B01J 37/0201* (2013.01); *B01J 37/04* (2013.01); *C10G 11/04* (2013.01); *C10G 11/05* (2013.01); *C10G 11/18* (2013.01); *B01J 2229/126* (2013.01); *B01J 2229/186* (2013.01); *B01J 2229/26* (2013.01)

(58) Field of Classification Search
USPC ............ 502/60, 63, 64, 65, 68, 69, 73, 202; 208/114, 119, 120.01, 122
See application file for complete search history.

(56) References Cited

U.S. PATENT DOCUMENTS

| | | | |
|---|---|---|---|
| 3,409,541 A | 11/1968 | Flanders et al. | |
| 4,049,573 A | 9/1977 | Kaeding | |
| 4,192,770 A | 3/1980 | Singleton | |
| 4,295,955 A | 10/1981 | Tu | |
| 4,430,199 A | 2/1984 | Durante et al. | |
| 4,465,779 A * | 8/1984 | Occelli ............ | B01J 37/04 502/63 |
| 4,493,902 A | 1/1985 | Brown et al. | |
| 4,615,996 A * | 10/1986 | Occelli ............ | B01J 29/06 208/120.01 |
| 4,663,018 A | 5/1987 | Reid et al. | |
| 5,071,539 A | 12/1991 | Hayward et al. | |
| 5,151,394 A | 9/1992 | Chitnis et al. | |
| 5,258,113 A | 11/1993 | Edgerton et al. | |
| 5,300,215 A | 4/1994 | Chitnis et al. | |
| 5,378,670 A | 1/1995 | Kumar | |
| 5,559,067 A | 9/1996 | Lerner et al. | |
| 5,618,407 A | 4/1997 | Kallenbach et al. | |
| 6,110,357 A | 8/2000 | Senn et al. | |
| 6,174,432 B1 | 1/2001 | Mizutani et al. | |
| 6,656,347 B2 | 12/2003 | Stockwell et al. | |
| 6,673,235 B2 | 1/2004 | Harris et al. | |
| 6,716,338 B2 | 4/2004 | Madon et al. | |
| 6,942,783 B2 | 9/2005 | Xu et al. | |
| 7,122,493 B2 | 10/2006 | Ou et al. | |
| 7,122,494 B2 | 10/2006 | Ou et al. | |
| 8,197,669 B2 | 6/2012 | Vierheilig | |
| 2003/0209468 A1 | 11/2003 | Su et al. | |

(Continued)

FOREIGN PATENT DOCUMENTS

| | | |
|---|---|---|
| CN | 1325940 | 12/2001 |
| CN | 101537368 | 9/2009 |

(Continued)

OTHER PUBLICATIONS

International Search Report & Written Opinion dated Apr. 30, 2015.
English Machine Translation of JP-09-085097, 9 pages.
English Machine Translation of JP-2010-082547, 11 pages.
McLean, Joseph et al., Multi-stage reaction catalysts: Recently trialled manufacturing technology combines two or more FCC catalyst functionalities wihin the same catalyst particle, *PTQ, Q3*, 2011, 8 pages.

*Primary Examiner* — Elizabeth Wood
(74) *Attorney, Agent, or Firm* — Foley & Lardner LLP

(57) ABSTRACT

Described are fluid catalytic cracking (FCC) compositions, methods of manufacture and use. FCC catalyst compositions comprise particles containing a non-zeolitic component and one or more boron oxide components. In embodiments, the FCC catalyst composition contains a zeolite component and optionally a rare earth component and a transition alumina. FCC catalytic compositions may comprise a first particle type containing one or more boron oxide components and a first matrix component mixed with a second particle type containing a second matrix component, and a zeolite. The FCC catalyst compositions can be used to crack hydrocarbon feeds, particularly resid feeds containing high V and Ni, resulting in lower hydrogen and coke yields.

16 Claims, No Drawings

(56) References Cited

U.S. PATENT DOCUMENTS

| | | | |
|---|---|---|---|
| 2004/0266608 A1* | 12/2004 | Long | B01J 29/061 502/68 |
| 2008/0314798 A1* | 12/2008 | Stockwell | B01J 29/084 208/118 |
| 2009/0112035 A1* | 4/2009 | Choi | B01J 21/02 585/500 |
| 2011/0000821 A1 | 1/2011 | Stockwell et al. | |
| 2012/0037540 A1 | 2/2012 | Jansen et al. | |
| 2012/0118793 A1 | 5/2012 | Hoffer et al. | |
| 2013/0066131 A1 | 4/2013 | Harris | |
| 2013/0115164 A1 | 5/2013 | Fu et al. | |

FOREIGN PATENT DOCUMENTS

| | | |
|---|---|---|
| GB | 1313174 | 4/1973 |
| JP | 09-085097 | 3/1997 |
| JP | 2010-82547 | 4/2010 |
| WO | WO-94/21378 | 9/1994 |

\* cited by examiner under United States Patent
US 9,895,680 B2

FCC CATALYST COMPOSITIONS CONTAINING BORON OXIDE

TECHNICAL FIELD

The present invention relates to a fluid catalytic cracking catalyst and to a hydrocarbon catalytic cracking process using the catalyst. More particularly, the invention relates to a fluid catalytic cracking catalyst composition comprising one or more boron oxide components for improved catalytic performance in the presence of contaminant metals.

BACKGROUND

Catalytic cracking is a petroleum refining process that is applied commercially on a very large scale. Catalytic cracking, and particularly fluid catalytic cracking (FCC), is routinely used to convert heavy hydrocarbon feedstocks to lighter products, such as gasoline and distillate range fractions. In FCC processes, a hydrocarbon feedstock is injected into the riser section of a FCC unit, where the feedstock is cracked into lighter, more valuable products upon contacting hot catalyst circulated to the riser-reactor from a catalyst regenerator.

It has been recognized that for a fluid catalytic cracking catalyst to be commercially successful, it must have commercially acceptable activity, selectivity, and stability characteristics. It must be sufficiently active to give economically attractive yields, have good selectivity towards producing products that are desired and not producing products that are undesired, and it must be sufficiently hydrothermally stable and attrition resistant to have a commercially useful life.

Exccessive coke and hydrogen is undesirable in commercial catalytic cracking processes. Even small increases in the yields of these products relative to the yield of gasoline can cause significant practical problems. For example, increases in the amount of coke produced can cause undesirable increases in the heat that is generated by burning off the coke during the highly exothermic regeneration of the catalyst. Conversely, insufficient coke production can also distort the heat balance of the cracking process. In addition, in commercial refineries, expensive compressors are used to handle high volume gases, such as hydrogen. Increases in the volume of hydrogen produced, therefore, can add substantially to the capital expense of the refinery.

Improvements in cracking activity and gasoline selectivity of cracking catalysts do not necessarily go hand in hand. Thus, a cracking catalyst can have outstandingly high cracking activity, but if the activity results in a high level of conversion to coke and/or gas at the expense of gasoline the catalyst will have limited utility. Catalytic cracking in current FCC catalysts is attributable to both the zeolite and non-zeolite (e.g. matrix) components. Zeolite cracking tends to be gasoline selective, while matrix cracking tends to be less gasoline selective.

In recent years, the oil refining industry has shifted to processing a larger quantity of residual (resid) and resid-containing feeds due to changes in the price structure and availability of crude oil. Many refiners have been processing at least a portion of residual oil in their units and several now run a full residual oil cracking program. Processing resid feeds can drastically alter yields of valuable products in a negative direction relative to a light feed. Aside from operational optimizations, the catalyst has a large impact on product distribution. Several factors are important to resid catalyst design. It is highly favorable if the catalyst can minimize coke and hydrogen formation, have high stability, and minimize deleterious contaminant selectivity due to metal contaminants in resid feedstocks.

Resid feeds typically contain contaminant metals including Ni, V, Fe, Na, Ca, and others. Resid FCC for converting heavy resid feeds with high Ni and V contaminants constitutes the fastest growing FCC segment globally. Both Ni and V catalyze unwanted dehydrogenation reactions, but Ni is an especially active dehydrogenation catalyst. Ni significantly increases $H_2$ and coke yields. In addition to taking part in unwanted dehydrogenation reactions, V comes with other major concerns as it is highly mobile under FCC conditions and its interaction with the zeolite destroys its framework structure, which manifests itself as increased $H_2$ and coke yields, as well as lower zeolite surface area retention. Even small amounts (e.g., 1-5 ppm) of contaminant metals in the feed cumulatively deposited on the catalyst can result in high $H_2$ and coke yields during FCC operation, if the catalyst does not feature an optimized metals passivation system, which is a major concern for the refining industry.

Since the 1960s, most commercial fluid catalytic cracking catalysts have contained zeolites as an active component. Such catalysts have taken the form of small particles, referred to as microspheres, containing both an active zeolite component and a non-zeolite component in the form of a high alumina, silica-alumina (aluminosilicate) matrix. The active zeolitic component is incorporated into the microspheres of the catalyst by one of two general techniques. In one technique, the zeolitic component is crystallized and then incorporated into microspheres in a separate step. In the second technique, the in situ technique, microspheres are first formed and the zeolitic component is then crystallized in the microspheres themselves to provide microspheres containing both zeolitic and non-zeolitic components. For many years a significant proportion of commercial FCC catalysts used throughout the world have been made by in situ synthesis from precursor microspheres containing kaolin that had been calcined at different severities prior to formation into microspheres by spray drying. U.S. Pat. No. 4,493,902 ("the '902 patent"), incorporated herein by reference in its entirety, discloses the manufacture of fluid cracking catalysts comprising attrition-resistant microspheres containing Y zeolite with faujisite structure, formed by crystallizing sodium Y zeolite in porous microspheres composed of metakaolin and spinel. The microspheres in the '902 patent contain more than about 40%, for example 50-70% by weight Y zeolite. Such catalysts can be made by crystallizing more than about 40% sodium Y zeolite in porous microspheres composed of a mixture of two or more different phases of chemically reactive calcined clay, namely, metakaolin (kaolin calcined to undergo a strong endothermic reaction associated with dehydroxylation) and kaolin clay calcined under conditions more severe than those used to convert kaolin to metakaolin, i.e., kaolin clay calcined to undergo the characteristic kaolin exothermic reaction, sometimes referred to as the spinel form of calcined kaolin. This characteristic kaolin exothermic reaction is sometimes referred to as kaolin calcined through its "characteristic exotherm." The microspheres containing the two forms of calcined kaolin clay are immersed in an alkaline sodium silicate solution, which is heated, until the desired amount of Y zeolite with faujisite structure is crystallized in the microspheres.

Fluid cracking catalysts which contain silica-alumina or alumina matrices are termed catalysts with "active matrix." Catalysts of this type can be compared with those containing untreated clay or a large quantity of silica, which are termed "inactive matrix" catalysts. In relation to catalytic cracking, despite the apparent disadvantage in selectivity, the inclusion of aluminas or silica-alumina has been beneficial in certain circumstances. For instance when processing a hydrotreated/demetallated vacuum gas oil (hydrotreated VGO) the penalty in non-selective cracking is offset by the benefit of cracking or "upgrading" the larger feed molecules which are initially too large to fit within the rigorous confines of the zeolite pores. Once "precracked" on the alumina or silica-alumina surface, the smaller molecules may then be selectively cracked further to gasoline material over the zeolite portion of the catalyst. While one would expect that this precracking scenario might be advantageous for resid feeds, they are, unfortunately, characterized as being heavily contaminated with metals such as nickel and vanadium and, to a lesser extent, iron. When a metal such as nickel deposits on a high surface area alumina such as those found in typical FCC catalysts, it is dispersed and participates as highly active centers for the catalytic reactions which result in the formation of contaminant coke (contaminant coke refers to the coke produced discretely from reactions catalyzed by contaminant metals) and hydrogen. This additional coke exceeds that which is acceptable by refiners. Loss of activity or selectivity of the catalyst may also occur if the metal contaminants (e.g. Ni, V) from the hydrocarbon feedstock deposit onto the catalyst. These metal contaminants are not removed by standard regeneration (burning) and contribute to high levels of hydrogen, dry gas and coke, and reduce significantly the amount of gasoline that can be made.

U.S. Pat. No. 4,192,770 describes a process of restoring selectivity of cracking catalysts which are contaminated with metals during catalytic cracking operations. The catalysts are restored by adding boron to either the fresh make-up catalyst or to the catalyst during operations. One problem with this approach is that boron is directly placed on the catalyst, which may negatively impact the catalyst material. In addition, such an approach addresses the problem after it has occurred, by treating the catalyst after it has been contaminated. U.S. Pat. No. 4,295,955 utilizes a similar approach by restoring catalyst that has been contaminated with metals. U.S. Pat. No. 4,295,955 also shows in the examples that fresh catalyst can be treated with boron to attenuate residual metals on the fresh catalyst that contribute to the undesirable yield of hydrogen. U.S. Pat. Nos. 5,5151, 394 and 5,300,215 disclose catalyst compositions comprising molecular sieve materials and a boron phosphate matrix. The Examples state that the addition of boron phosphate to the matrix does not change the physical properties or attrition resistance, but the addition of boron phosphate produced gasoline with higher octane in a cracking process.

While the aforementioned patents show the utility of boron compounds for treating contaminated catalysts and attenuating residual metals on catalyst materials, it would be desirable to provide materials that allow the addition of boron to FCC processes and units under dynamic and varying conditions. It also would be desirable to provide FCC processes and FCC catalyst compositions that can reduce coke and hydrogen yields for a variety of FCC unit conditions and hydrocarbon feeds, for example, feeds containing high levels of transition metals, such as resid feeds.

SUMMARY

One aspect of the invention is directed to a fluid catalytic cracking (FCC) catalyst composition for cracking hydrocarbons. Various embodiments are listed below. It will be understood that the embodiments listed below may be combined not only as listed below, but in other suitable combinations in accordance with the scope of the invention.

In embodiment one, the catalyst composition comprises: FCC compatible inorganic particles containing one or more boron oxide components and cracking particles, the FCC catalyst composition effective to reduce coke and hydrogen yields during cracking of metal-containing FCC feeds.

Embodiment two is directed to a modification of catalyst composition embodiment one, wherein the one or more boron oxide components are present in an amount in the range of 0.005% to 8% by weight of the composition.

Embodiment three is directed to a modification of catalyst composition embodiment one or two, wherein the cracking particles comprise 20% to 95% by weight of a zeolite component.

Embodiment four is directed to a modification of any of catalyst composition embodiments one through three, wherein the FCC compatible inorganic particle comprises a non-zeolitic component.

Embodiment five is directed to a modification of any of catalyst composition embodiments one through four, wherein the non-zeolitic component is selected from the group consisting of kaolinite, halloysite, montmorillonite, bentonite, attapulgite, kaolin, amorphous kaolin, metakaolin, mullite, spinel, hydrous kaolin, clay, gibbsite (alumina trihydrate), boehmite, titania, alumina, silica, silica-alumina, silica-magnesia, magnesia and sepiolite.

Embodiment six is directed to a modification of any of catalyst composition embodiments one through five, wherein the cracking particle contains oxide is selected from the group consisting of yttria, ceria, lanthana, praseodymia, neodymia, and combinations thereof.

Embodiment seven is directed to a modification of any of catalyst composition embodiments one through six, wherein the rare earth component is lanthana, and the lanthana is present in a range of 0.5 wt. % to about 5.0 wt. % on an oxide basis based on the weight of the FCC catalyst composition.

Embodiment eight of the invention is directed to a modification of any of catalyst composition embodiments one through seven, the cracking particle further comprising a transition alumina component present in a range of 1 wt. % to 35 wt. %.

Embodiment nine is directed to a modification of any of catalyst composition embodiments one through eight, wherein the zeolite is intergrown with the non-zeolitic component.

Embodiment ten is directed to a modification of any of catalyst composition embodiments one through nine, wherein the zeolite component is mixed with the non-zeolitic component.

Embodiment eleven is directed to a modification of any of catalyst composition embodiments one through ten, wherein the one or more boron oxide components are on the cracking particles.

Another aspect of the invention pertains to an FCC catalyst composition for cracking hydrocarbons. Therefore, embodiment twelve is directed to a catalyst composition comprising a first particle type comprising one or more boron oxide components and a first matrix component and a second particle type having a composition different from the first particle type, the second particle type comprising a second matrix component and 20% to 95% by weight of a zeolite component, wherein the first particle type and second particle type are mixed together.

Embodiment thirteen is directed to a modification of catalyst composition embodiment twelve, wherein the first and second matrix components comprise a non-zeolitic material.

Embodiment fourteen is directed to a modification of any of catalyst composition embodiment twelve or thirteen, wherein the one or more boron oxide components are on second particle type.

Embodiment fifteen is directed to a modification of any of method embodiments twelve through fourteen, wherein the non-zeolitic material is selected from the group consisting of kaolinite, halloysite, montmorillonite, bentonite, attapulgite, kaolin, amorphous kaolin, metakaolin, mullite, spinel, hydrous kaolin, clay, gibbsite (alumina trihydrate), boehmite, titania, alumina, silica, silica-alumina, silica-magnesia, magnesia and sepiolite.

Another aspect of the invention pertains to a method of cracking a hydrocarbon feed under fluid catalytic cracking conditions. Therefore, embodiment sixteen is directed to a method comprising contacting the hydrocarbon feed with any of the catalyst composition embodiments one through eleven.

Another aspect of the invention pertains to a method of cracking a hydrocarbon feed under fluid catalytic cracking conditions. Therefore, embodiment seventeen is directed to a method comprising contacting the hydrocarbon feed with any of the catalyst composition embodiments twelve through fifteen.

Another aspect of the invention pertains to method of manufacturing a fluid catalytic cracking catalyst (FCC) composition. Therefore, embodiment eighteen is directed to a method comprising forming particles containing a non-zeolitic component and one or more boron oxides.

Embodiment nineteen is directed to a modification of method embodiment eighteen, wherein the one or more boron oxides are impregnated onto the particles.

Embodiment twenty is directed to a modification of method embodiment eighteen or nineteen, wherein the one or more boron oxides are mixed with the non-zeolitic component and spray dried to form the particles.

Embodiment twenty-one is directed to a modification of any of method embodiments eighteen through nineteen, wherein the formed particles further comprise a molecular sieve.

Embodiment twenty-two is directed to a modification of any of method embodiments eighteen through twenty-one, wherein the one or more oxides are loaded on non-zeolitic particles.

Embodiment twenty-three is directed to a modification of any of method embodiments eighteen through twenty-two, wherein one or more boron oxide components are added to non-zeolitic particles during calcination of the particles.

Embodiment twenty-four is directed to a modification of any of method embodiments eighteen through twenty-three, wherein the non-zeolitic material is selected from the group consisting of kaolinite, halloysite, montmorillonite, bentonite, attapulgite, kaolin, amorphous kaolin, metakaolin, mullite, spinel, hydrous kaolin, clay, gibbsite (alumina trihydrate), boehmite, titania, alumina, silica, silica-alumina, silica-magnesia, magnesia and sepiolite, the particle further comprising a transition alumina and a zeolite component intergrown in situ with the particles.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Each FCC unit has a unique capacity and hydrocarbon feed, which means that a variety of boron-containing catalyst materials containing different amounts of boron are needed. For example, resid feeds have higher metals content than other types of hydrocarbon feeds, which may require more boron than other hydrocarbon feeds that have lower metals content. Furthermore, even in the same FCC unit, the catalyst in the unit degrades over time, and it may be desirable to increase or decrease the amount of boron in the unit to address the metals content of a particular process at a particular time. Also, the quality of the hydrocarbon feed can change over time, and some hydrocarbon feeds may require a different boron content to handle the different metals content. Further, it would be desirable to provide processes in which boron is not placed in direct contact with zeolite on the cracking particles when the boron is applied to the material that is added to the unit. Boron can have a deleterious effect on zeolite, for example, causing dealumination and/or partial loss of crystallinity. It would be desirable to provide a boron-containing additive that could be used with a variety of FCC catalyst compositions that address metals content under a variety of conditions. In particular, it would be desirable to provide a way of providing varied boron content to various FCC feeds by utilizing solid, inert, FCC compatible inorganic particles containing boron, which also avoids direct application of boron materials to the cracking particles.

As used herein, "cracking particle" refers to a particle which contains an active cracking component conventionally present to effect the more selective hydrocarbon cracking reactions to provide more desired products such as gasoline, propylene and LPG. Normally, the active cracking component to effect the more selective hydrocarbon cracking reactions comprises a molecular sieve such as a zeolite. The active cracking component is combined with a matrix material such as silica or alumina as well as a clay to provide the desired mechanical characteristics such as attrition resistance. It is understood that the matrix material has some cracking activity, but matrix material is less selective in cracking. As used herein, "FCC compatible inorganic particle" is a particle that is less selective in providing the more valuable products such as gasoline, propylene and LPG. Particles may be in the form of microspheres.

As used herein, "mobile," refers to the ability of boron to move within and between particle types in the FCC unit.

Thus, the FCC compatible inorganic particles can be present in a range of 1% to 40% by weight of the FCC catalyst composition. Thus, there is between 60 and 99% by weight of cracking particles by weight of the FCC catalyst composition. Examples of amounts of FCC compatible inorganic particles based on the total weight of the FCC catalyst composition include 1,%, 2%, 3%, 4%, 5%, 6,%, 7%, 8%, 9%, 10%, 15%, 20%, 25%, 30%, 35% and 40%. Examples of amounts of cracking particles based on the total weight of the FCC catalyst composition include 99%, 98%, 97%, 96%, 95%, 94%, 93%, 92%, 91%, 90%, 85%, 80%, 75%, 70%, 65% and 60%. In one or more embodiments, the FCC compatible inorganic particles contain one or more boron oxides in the range of 0.005% to 20% by weight of the FCC compatible inorganic particles. When added to the cracking particles, the amount of boron present is in the range of 0.005 and 8% on an oxide basis based upon the total weight of FCC compatible inorganic particle and cracking particles in the FCC unit.

Embodiments of the present invention provide a FCC catalyst composition, which uses one or more boron oxide components for metal, particularly, nickel passivation. The presence of boron oxide in a fluid catalytic cracking catalyst as a trapping/passivating material results in lower hydrogen and coke yields when processing heavy hydrocarbons feeds, particularly resid feeds, contaminated with transition metals. Passivating or passivation refers to the ability of the boron component to reduce or prevent the activity of deleterious metals (such as nickel) from negatively impacting the selectivity of the FCC process. Provided herein are FCC catalysts, methods of making FCC catalysts, and methods of cracking hydrocarbon feeds.

One aspect of the invention relates to a fluid catalytic cracking (FCC) catalyst composition for cracking hydrocarbons, the FCC catalyst composition comprising FCC compatible inorganic particles, and one or more boron oxide components, the FCC catalyst composition effective to reduce coke and hydrogen yields during cracking of hydrocarbons. Lowering hydrogen yields is beneficial in wet gas compressor-limited processes. In one or more embodiments, the FCC compatible inorganic particles can include one or more of metakaolin, spinel, kaolin and mullite. The FCC catalyst composition is typically in the form of particles, more specifically as microspheres, which will be described further below.

The non-zeolitic material may also be referred to as matrix material, as discussed further below. In one embodiment of the invention, a FCC catalyst composition comprises particles consisting essentially of matrix material and one or more boron oxides. This composition, consisting essentially of matrix material and one or more boron oxides, provides a first particle type. In one embodiment, this first particle type can be used together with existing FCC catalyst compositions to reduce coke and hydrogen yields during cracking processes. For example, the first particle type may be introduced into an FCC unit with a second particle type, the second particle type comprising a non-zeolitic component, a transition alumina component, a zeolite component, and a rare earth component.

As an alternative to providing a first particle type and a second particle type, one or more boron oxides can be used in a FCC catalyst composition comprising particles containing a non-zeolitic component, a transition alumina component, a zeolite component, and a rare earth component. In this alternative approach, the boron and the active FCC catalyst are incorporated into an all-in-one particle. According to embodiments of the present invention, when present in the composition, the zeolite component is present in a range of 20% to 95% by weight based on the catalyst composition.

Thus, embodiments of the invention provide FCC catalyst compositions comprising particles comprising a non-zeolitic matrix, and one or more boron oxide components. Providing two separate particle types allows boron oxide-containing particles to be added to a FCC catalyst composition in the unit as needed to passivate feeds having high metal contents.

Thus, embodiments of the present invention provide FCC catalyst compositions using boron oxide-modified particles, which, according to one or more embodiments, can be made by spray drying a mixture of mullite, hydrous kaolin, and a suitable binder, for example, a silicate binder, and then modifying the particles with one or more boron oxide components as described below. In one or more embodiments, the boron can be added during spray-drying. In embodiments in which the catalyst composition comprises a single particle type containing boron, the particles may also include a transition alumina and a zeolite. The zeolite can be added as separate particles to the composition during spray drying, or the zeolite can be intergrown in the particle composition by the in situ crystallization of the zeolite. The particles may further include a rare earth component. Thus, in an embodiment of the invention, particles are provided which contain a non-zeolitic component, a zeolite, a transition alumina, a rare earth component, and one or more boron oxide components.

In an alternative embodiment, as noted above, a first microsphere type comprises a non-zeolitic matrix and one or more boron oxide components, and a second microsphere type comprising a non-zeolitic matrix, a transition alumina, a zeolite, and a rare earth component.

According to one or more embodiments, a catalyst composition is provided which exhibits higher performance in which a mobile boron oxide species prevents contaminant metals from interfering with catalyst selectivity, and reducing coke and hydrogen yield.

With respect to the terms used in this disclosure, the following definitions are provided.

As used herein, the term "catalyst" or "catalyst composition" or "catalyst material" refers to a material that promotes a reaction.

As used herein, the term "fluid catalytic cracking" or "FCC" refers to a conversion process in petroleum refineries wherein high-boiling, high-molecular weight hydrocarbon fractions of petroleum crude oils are converted to more valuable gasoline, olefinic gases, and other products.

As used herein, the term "feed" or "feedstock" refers to that portion of crude oil that has a high boiling point and a high molecular weight. In FCC processes, a hydrocarbon feedstock is injected into the riser section of a FCC unit, where the feedstock is cracked into lighter, more valuable products upon contacting hot catalyst circulated to the riser-reactor from a catalyst regenerator.

"Cracking conditions" or "FCC conditions" refers to typical FCC process conditions. Typical FCC processes are conducted at reaction temperatures of 450° to 650° C. with catalyst regeneration temperatures of 600° to 850° C. Hot regenerated catalyst is added to a hydrocarbon feed at the base of a rise reactor. The fluidization of the solid catalyst particles may be promoted with a lift gas. The catalyst vaporizes and superheats the feed to the desired cracking temperature. During the upward passage of the catalyst and feed, the feed is cracked, and coke deposits on the catalyst. The coked catalyst and the cracked products exit the riser and enter a solid-gas separation system, e.g., a series of cyclones, at the top of the reactor vessel. The cracked products are fractionated into a series of products, including gas, gasoline, light gas oil, and heavy cycle gas oil. Some heavier hydrocarbons may be recycled to the reactor.

As used herein, the term "resid" refers to that portion of crude oil that has a high boiling point and a high molecular weight and typically contains contaminant metals including Ni, V, Fe, Na, Ca, and others. The contaminant metals, particularly Ni and V, have detrimental effects on catalyst activity and performance. In some embodiments, in a resid feed operation, one of Ni and V metals accumulate on the catalyst, and the FCC catalyst composition is effective to reduce the detrimental effects of nickel and vanadium during cracking.

As used herein, the term "one or more boron oxide components" refers to the presence of multiple species of boron oxide. For example, in one or more embodiments, boron oxide components can include a boron oxide in a trigonal environment (e.g. $BO_3$) and in a tetrahedral oxygen environment (e.g. $BO_{4-}$). Differences in the chemical composition of the boron oxide species after reaction with FCC catalysts containing Ni and other metals can be observed by peak changes in boron nuclear magnetic resonance ($^{11}B$ NMR) analyses. It is believed that boron oxide can interact with transition metals, such as Ni and V, and inhibit the dehydrogenation activity of the transition metal by forming a metal-borate (e.g. Ni-borate) complex, which results in a reduction in coke and hydrogen yields during cracking of hydrocarbons. However, because boron oxide is mobile under typical FCC conditions, the trapping mechanism is different than that of a transition alumina.

As used herein, "particles" can be in the form of microspheres which can be obtained by spray drying. As is understood by skilled artisans, microspheres are not necessarily perfectly spherical in shape.

As used herein, the term "non-zeolitic component" refers to the components of a FCC catalyst that are not zeolites or molecular sieves. As used herein, the non-zeolitic component can comprise binder and filler. The phrase "non-zeolitic component" may be used interchangeably with the phrase "matrix material." According to one or more embodiments, the "non-zeolitic component" can be selected from the group consisting of kaolinite, halloysite, montmorillonite, bentonite, attapulgite, kaolin, amorphous kaolin, metakaolin, mullite, spinel, hydrous kaolin, clay, gibbsite (alumina trihydrate), boehmite, titania, alumina, silica, silica-alumina, silica-magnesia, magnesia and sepiolite.

As used herein, the term "molecular sieve" refers to a material comprising a framework based on an extensive three-dimensional network of oxygen ions containing generally tetrahedral type sites. As used herein, the term "zeolite" refers to a molecular sieve, which is a crystalline aluminosilicate with a framework based on an extensive three-dimensional network of oxygen ions and have a substantially uniform pore distribution.

As used herein, the term "in situ crystallized" refers to the process in which a zeolite is grown or intergrown directly on/in a microsphere and is intimately associated with the matrix or non-zeolitic material for example, as described in U.S. Pat. Nos. 4,493,902 and 6,656,347. "Transition alumina" is defined as any alumina which is intermediate between the thermodynamically stable phases of gibbsite, bayerite, boehmite, pseudoboehmite, and nordstrandite on one end of the spectrum and alpha alumina or corundum on the other. Such transition aluminas may be viewed as metastable phases. A scheme of the transformation sequence can be found in the text: Oxides and Hydroxides of Aluminum by K. Wefers and C. Misra; Alcoa Technical Paper No. 19, revised; copyright Aluminum Company of America Laboratories, 1987.

FCC catalyst compositions which include a zeolite component have a catalytically active crystallized aluminosilicate material, such as, for example, a large-pore zeolite crystallized on or in a microsphere comprising non-zeolitic material. Large pore zeolite cracking catalysts have pore openings of greater than about 7 Angstroms in effective diameter. Conventional large-pore molecular sieves include zeolite X; REX; zeolite Y; Ultrastable Y (USY); Rare Earth exchanged Y (REY); Rare Earth exchanged USY (REUSY); Dealuminated Y (DeAl Y); Ultrahydrophobic Y (UHPY); and/or dealuminated silicon-enriched zeolites, e.g., LZ-210. According to one or more embodiments, the FCC catalyst comprises catalytic microspheres comprising a crystalline aluminosilicate material selected from zeolite Y, ZSM-20, ZSM-5, zeolite beta, zeolite L; and naturally occurring zeolites such as faujasite, mordenite and the like, and a non-zeolitic component. These materials may be subjected to conventional treatments, such as calcinations and ion exchange with rare earths to increase stability.

Particles (e.g. microspheres) comprising hydrous kaolin clay and/or metakaolin, a dispersible boehmite, optionally spinel and/or mullite, and a sodium silicate or silica sol binder can be prepared in accordance with the techniques described in U.S. Pat. No. 6,716,338, which is incorporated herein by reference. For example, the catalysts can be made by crystallizing the desired amount of sodium Y zeolite in porous microspheres composed of a mixture of two different forms of chemically reactive calcined clay, namely, metakaolin and spinel. The microspheres containing the two forms of calcined kaolin clay are immersed in an alkaline sodium silicate solution, which is heated, until the maximum obtainable amount of Y zeolite is crystallized in the microspheres. The amount of zeolite according to embodiments of the invention is in the range of 20% to 95%, or 30% to 60%, or 30% to 45% by weight based on the weight of the FCC catalyst composition.

Preparation of Boron Oxide-Containing Particles

As described above, the FCC catalyst compositions can be provided utilizing first and second particle types. Alternatively, a FCC catalyst composition can be provided wherein the boron can be incorporated into a single particle type (an all-in-one particle—one or more boron oxide components, nonzeolitic component, a zeolite component and optionally one or more of a transition alumina component and a rare earth component). In a FCC catalyst composition utilizing a single particle type, the boron can be incorporated in a variety of ways. In one or more embodiments, the boron is placed on an all-in-one particle such that the boron is separated from the zeolite on the particle.

For example, boron oxide-containing particles can be prepared by impregnating a matrix with boron. As used herein, the term "impregnated" means that a boron containing solution is put into pores of a material, such as a non-zeolitic component or a zeolite. In one or more embodiments, particles are made utilizing the processes described in U.S. Pat. Nos. 5,559,067 and 6,716,338, as described further below in the manufacture of the second particle type. Boron oxide can be incorporated during particle manufacture at various stages of the process. For example, boron oxide can be incorporated during particle formation such as during spray drying, after particle formation such as during calcination or during ion exchange of the zeolite after the particles are formed. One or more boron oxide components are present in an amount in the range of 0.005% and 7% by weight, including 0.005%, 0.01%, 0.1%, 0.2%, 0.3%, 0.4%, 0.5%, 0.6%, 0.7%, 0.8%, 0.9%, 1.0%, 1.5%, 2.0%, 2.5%, 3.0%, 3.5%, 4.0%, 4.5%, 5.0%, 5.5%, 6.0%, 6.5% and 7.0% by weight on an oxide basis based on the weight of the FCC catalyst composition.

In one or more embodiments, one or more boron oxide components are mixed with the FCC compatible inorganic particles and spray dried to form the particles. In other embodiments, one or more boron oxide components are spray loaded onto FCC compatible inorganic particles. The loading can occur by a variety of techniques such as impregnation, spray-coating, etc.

In still further embodiments, one or more boron oxide components are added to FCC compatible inorganic particles during calcination of the particles. The spray dried particles are formed in the usual way, and the one or more boron oxide components can be added during calcination.

In an alternative embodiment, boron can be added to the zeolite containing particles during ion exchange, as described further below.

Preparation of Catalyst Compositions Including First and Second Particle Types

As mentioned above, catalyst compositions can be provided utilizing a first particle type consisting essentially of one or more boron oxides and matrix material and a second particle type containing matrix material, zeolite, transition alumina, and a rare earth component. A first particle type containing boron oxide can be prepared by mixing a matrix component (e.g. metakaolin, spinel, kaolin, mullite, etc.) with boron oxide. In accordance with the methods described in U.S. Pat. Nos. 5,559,067 and 6,716,338, which are incorporated herein by reference, microspheres comprising one or more boron oxide components, and a matrix component including hydrous kaolin clay, gibbsite (alumina trihydrate), spinel, and a silica sol binder, for example, an aluminum stabilized silica sol binder, are prepared by spray drying. It will be understood that the first particle type does not incorporate a zeolite and therefore, a subsequent zeolite crystallization step is not utilized to make the first particle type. The microspheres are calcined to convert the hydrous kaolin component to metakaolin. The spray dried microspheres can be washed before calcination to reduce the sodium content if the sol binder contains a water soluble source of sodium, converted to sodium sulfate. One or more boron oxide components are then added and are present in an amount in the range of 0.005% and 7% by weight, including 0.1%, 0.2%, 0.3%, 0.4%, 0.5%, 0.6%, 0.7%, 0.8%, 0.9%, 1.0%, 0.005% and 7% by weight, including 0.005%, 0.01%, 0.1%, 0.2%, 0.3%, 0.4%, 0.5%, 0.6%, 0.7%, 0.8%, 0.9%, 1.0%, 1.5%, 2.0%, 2.5%, 3.0%, 3.5%, 4.0%, 4.5%, 5.0%, 5.5%, 6.0%, 6.5% and 7.0% by weight on an oxide basis based on the weight of the FCC catalyst composition.

Preparation of Second Particle Type

According to one or more embodiments, a second particle type is prepared by in situ techniques according to the processes established in U.S. Pat. No. 5,559,067 (the '067 patent) and U.S. Pat. No. 6,716,338 (the '338 patent), which are herein incorporated by reference in their entireties. In general, the microspheres are first formed, and the zeolitic component is then crystallized in/on the microspheres themselves to provide microspheres containing both zeolitic and non-zeolitic components.

An aqueous slurry of finely divided hydrous kaolin, kaolin that has been calcined through its characteristic exotherm, and binder is prepared. The slurry can optionally contain boehmite. In specific embodiments, the hydrous kaolin, calcined kaolin and binder are premixed in one tank and fed to the spray drier from one line. When present, an aqueous alumina slurry, peptized such as with formic acid is introduced from a separate line immediately prior to when the whole mix enters the spray drier. Other mixing and injection protocols may also be useful. For example, a polymer dispersed alumina, for example dispersed with Flosperse® can be used in the process. The final slurry solids are about 30-70 wt. %. The aqueous slurry is then spray dried to obtain microspheres comprising a silica bonded mixture of hydrated kaolin, kaolin that has been calcined at least substantially through its characteristic exotherm (spinel, or mullite, or both spinel and mullite), and optionally boehmite.

The reactive kaolin of the slurry to form the microspheres can be formed of hydrated kaolin or calcined hydrous kaolin (metakaolin) or mixtures thereof as described in the '067 and '338 patents.

A commercial source of powdered kaolin calcined through the exotherm, may be used as the spinel component. Hydrated kaolin clay is converted to this state by calcining the kaolin at least substantially completely through its characteristic exotherm under the conditions described in the '338 patent. (The exotherm is detectable by conventional differential thermal analysis, DTA.). After completion of calcination, the a calcined clay can be pulverized into finely divided particles before being introduced into the slurry that is fed to a spray dryer. The spray dried product is repulverized. The surface area (BET) of typical spinel form kaolin is low, e.g., 5-10 $m^2/g$; however, when this material is placed in a caustic environment such as that used for crystallization, silica is leached, leaving an alumina-rich residue having a high surface area, e.g. 100-200 $m^2/g$ (BET).

Mullite can also be used as a matrix component. Mullite is made by firing clay at temperatures above 2000° F. For example M93 mullite may be made from the same kaolin clay, used for the preparation of spinel component. Mullite can also be made from other kaolin clays. Mullite may also be made from Kyanite clay. Heating Kyanite clay to a high temperature of 3000° F., provides a more crystalline, purer mullite in the calcined product than that obtained from kaolin clay.

According to one or more embodiments, the alumina used to prepare the microspheres is a highly dispersible boehmite. Dispersibility of the hydrated alumina is the property of the alumina to disperse effectively in an acidic media such as formic acid of pH less than about 3.5. Such acid treatment is known as peptizing the alumina. High dispersion is when 90% or more of the alumina disperses into particles less than about 1 micron. When this dispersed alumina solution is spray dried with the kaolin and binder, the resulting microsphere contains uniformly distributed alumina throughout the microsphere.

After spray drying, the microspheres are washed and calcined at a temperature and for a time (e.g., for two to four hours in a muffle furnace at a chamber temperature of about 1500° to 1550° F.) sufficient to convert the hydrated clay component of the micro spheres to metakaolin, leaving the spinel component of the microspheres essentially unchanged. In specific embodiments, the calcined microspheres comprise about 30 to 70% by weight metakaolin, about 10 to 50% by weight spinel and/or mullite and 0.5 to about 35% by weight transition phase alumina. In one or more embodiments, the transition phase alumina comprises one or more of eta, chi, gamma, delta or theta phase. In specific embodiments, the surface area (BET, nitrogen) of the crystalline boehmite (as well as the transition alumina) is below 150 $m^2/g$, specifically below 125 $m^2/g$, and more specifically, below 100 $m^2/g$, for example, 30-80 $m^2/g$.

In one or more embodiments, the catalyst comprises from about 1% to 35%, or 5% to 25%, or 10% to 20% by weight of a transition alumina component (e.g. boehmite).

When microspheres contain a zeolite, precursor microspheres, which are microspheres obtained by calcining a non-zeolitic matrix component and a transition alumina, are reacted with zeolite seeds and an alkaline sodium silicate solution, substantially as described in U.S. Pat. No. 5,395,809, the teachings of which are incorporated herein by cross-reference. The microspheres are crystallized to a desired zeolite content (for example, 20-95% by weight, or 30-60% by weight, or 30-45% by weight), filtered, washed, ammonium exchanged, exchanged with rare-earth cations if required, calcined, exchanged a second time with ammonium ions, and calcined a second time if required. The silicate for the binder can be provided by sodium silicates with $SiO_2$ to $Na_2O$ ratios of from 1.5 to 3.5, more specifically, ratios of from 2.00 to 3.22.

In specific embodiments, the crystallized aluminosilicate material comprises from about 20 to about 95 wt. % zeolite Y, for example, 30% to 60% by weight, or 30% to 45% by weight, expressed on the basis of the as-crystallized sodium faujasite form zeolite. In one or more embodiments, the Y-zeolite component of the crystalline aluminosilicate, in their sodium form, have a crystalline unit cell size range of between 24.64-24.73 Å, corresponding to a $SiO_2/Al_2O_3$ molar ratio of the Y-zeolite of about 4.1-5.2.

After crystallization by reaction in a seeded sodium silicate solution, the microspheres contain crystalline Y-zeolite in the sodium form. Sodium cations in the microspheres are replaced with more desirable cations. This may be accomplished by contacting the microspheres with solutions containing ammonium, yttrium cations, rare earth cations or combinations thereof. In one or more embodiments, the ion exchange step or steps are carried out so that the resulting catalyst contains less than about 0.7%, more specifically less than about 0.5% and even more specifically less than about 0.4%, by weight $Na_2O$. After ion exchange, the microspheres are dried. Rare earth levels in the range of 0.1% to 12% by weight, specifically 1-5% by weight, and more specifically 2-3% by weight are contemplated. More specifically, examples of rare earth compounds are the oxides of lanthanum, cerium, praseodymium, and neodymium. Typically, the amount of rare earth added to the catalyst as a rare earth oxide will range from about 1 to 5%, typically 2-3 wt. % rare earth oxide (REO). In general, the temperature of the impregnating solution will range from about 70-200° F. at a pH of from about 2-5.

Subsequent to the rare earth exchange, the catalyst composition in the form of microspheres is dried and then calcined at a temperature of from 800°-1200° F. The conditions of the calcination are such that the unit cell size of the zeolite crystals is not significantly reduced. Typically, the drying step, after rare earth exchange is to remove a substantial portion of the water contained within the catalyst, and calcination is conducted in the absence of added steam. The rare earth oxide-containing catalyst, subsequent to calcination, is now further acid exchanged, typically by ammonium ions to, again, reduce the sodium content to less than about 0.5 wt. % $Na_2O$. The ammonium exchange can be repeated to ensure that the sodium content is reduced to less than 0.5 wt. % $Na_2O$. Typically, the sodium content will be reduced to below 0.2 wt. % as $Na_2O$.

The catalysts of the invention can also be used in conjunction with additional V-traps. Thus, one or more embodiments, the catalyst further comprises a V-trap. The V-trap can be selected from one or more conventional V-traps including, but not limited to, MgO/CaO. Without intending to be bound by theory, it is thought that MgO/CaO interacts with $V_2O_5$ through an acid/base reaction to give less harmful vanadates.

Another aspect of the present invention is directed to a method of cracking a hydrocarbon feed under fluid catalytic cracking conditions. In one or more embodiments, the method comprises contacting the hydrocarbon feed with the boron oxide containing FCC catalyst composition of one or more embodiments. In one or more embodiments, the hydrocarbon feed is a resid feed. In one or more embodiments, in a resid feed operation, one of Ni and V metals accumulate on the catalyst, and the FCC catalyst composition is effective to reduce the detrimental effects nickel and vanadium during cracking, thus reducing coke and hydrogen yields.

Conditions useful in operating FCC units utilizing catalyst of the invention are known in the art and are contemplated in using the catalysts of the invention. These conditions are described in numerous publications including Catal. Rev.-Sci. Eng., 18 (1), 1-150 (1978), which is herein incorporated by reference in its entirety. The catalysts of one or more embodiments are particularly useful in cracking residuum and resid-containing feeds.

A further aspect of the present invention is directed to a method of manufacturing a FCC catalyst composition. In one or more embodiments, the method comprises forming FCC compatible inorganic particles containing a non-zeolitic component and one or more boron oxides. The one or more boron oxides can be impregnated onto the particles. Alternatively, the boron can be incorporated during spray drying, or using other techniques such as coating, etc.

In one or more embodiments, the one or more boron oxides are mixed with the non-zeolitic component and spray dried to form the particles. In other embodiments, the one or more boron oxides are loaded onto non-zeolitic particles. In still further embodiments, the one or more boron oxides are added to non-zeolitic particles during calcination of the particles.

In some embodiments, the non-zeolitic material includes metakaolin, kaolin, mullite, spinel, and combinations thereof. The particle can further comprise a transition alumina, a rare earth component, and a molecular sieve or zeolite component intergrown in situ with the particles, as described in U.S. Pat. Nos. 4,493,902 and 6,656,347. In one or more embodiments, one or more boron oxides are added to the particles including intergrown molecular sieve or zeolite during ion exchanges. According to one or more embodiments, the molecular sieve or zeolite and matrix can also be made using conventional techniques for mixing molecular sieves and matrix materials. For example, zeolite or molecular sieve components can be dry blended or wet ball milled together, and then added to a suitable matrix and further mixed. The matrix and zeolite mixture can be extruded, pilled, dropped in an oil bath, etc. to form relatively large particles. For use in fluidized bed catalytic cracking units the matrix-zeolite mixture can be spray dried, but any other means can be used to make fluidizable catalyst particles, such as crushing or grinding larger size extrudates or pills. The invention is now described with reference to the following examples.

EXAMPLES

Example 1

Comparative

Calcined kaolin (mullite) slurry made to 49% solids was added to 59% solids hydrous kaolin, while mixing, using a Cowles mixer. The mixture was screened and transferred to a spray dryer feed tank. The clay slurry was spray dried with sodium silicate injected in-line just prior to entering the atomizer. Sodium silicate (3.22 modulus) was used at a metered ratio to target 5 weight percent as $SiO_2$. The target particle size for the microspheres was 80 microns. The microspheres were processed to grow 60-65% zeolite Y using an in situ crystallization process. A sample of crystallized NaY microspheres (250 g) was ion exchanged to achieve a $Na_2O$ of 2.0% using ammonium nitrate. Rare earth (lanthanum) was then added to 1 wt. % REO. The rare earth exchanged sample was calcined at 1000° F. for 2 hours to stabilize the catalyst and facilitate zeolitic sodium removal. After calcinations, a series of ammonium nitrate ion exchanges was performed to <0.2 wt. % $Na_2O$. Finally, with the reduced sodium, a second calcination was done at 1100° F. for 2 hours in order to further stabilize the catalyst and reduce unit cell size. The catalyst composition is further impregnated with 3000 ppm of nickel then aged in the presence of steam at between 1350-1500° F. The catalytic activity and selectivity of the catalyst composition is determined using Advanced Cracking Evaluation (ACE) reactors and protocols.

Example 2

A catalyst composition as described in Example 1 was prepared with boron oxide added until the catalyst contained 1.0 wt. % of a boron component on an oxide basis.

Results

TABLE 1

Comparison of catalytic properties of catalyst formulations with and without boron oxide

| | | Catalytic Data at Constant Coke (8 wt %) | | | | | |
|---|---|---|---|---|---|---|---|
| Example # | $H_2$ | LPG | Gasoline | LCO | HCO | Conv. | Cat/Oil |
| Comp. Example 1 | 1.0 | 18.8 | 46.4 | 14.8 | 8.9 | 76.2 | 7.7 |
| Example 2 | 0.8 | 18.5 | 47.2 | 13.5 | 10.3 | 76.2 | 9.9 |

The results illustrate that when boron oxide is incorporated into the FCC catalyst composition, the result is lower hydrogen and higher gasoline yields when processing hydrocarbons feeds, particularly resid feeds, contaminated with transition metals, such as nickel.

Comparative Example 3

Calcined kaolin (mullite) (36.6 kg) slurry made to 49% solids was added to 59% solids hydrous kaolin (25.9 kg), while mixing, using a Cowles mixer. Next a 56% solids boehmite alumina (14 kg) slurry was slowly added to the mixing clay slurry and was allowed to mix for more than five minutes. The mixture was screened and transferred to a spray dryer feed tank. The clay/boehmite slurry was spray dried with sodium silicate injected in-line just prior to entering the atomizer. Sodium silicate (20.2 kg, 3.22 modulus) was used at a metered ratio of 1.14 liter/min slurry:0.38 liter/min silicate. The target particle size for the microspheres was 80 microns. Binder sodium was removed from the formed microspheres by slurrying the microspheres for thirty minutes and maintaining the pH from 3.5-4 using sulfuric acid. Finally, the acid neutralized microspheres were dried and calcined at 1350-1500° F. for two hours. The microspheres were processed to grow 60-65% zeolite Y using an in situ crystallization process. A sample of crystallized NaY microspheres (250 g) was ion exchanged to achieve a $Na_2O$ of 2.0% using ammonium nitrate. Lanthanum was then added to 3 wt. % REO. The rare earth exchanged sample was calcined at 1000° F. for 2 hours to stabilize the catalyst and facilitate zeolitic sodium removal. After calcinations, a series of ammonium nitrate ion exchanges was performed to achieve <0.2 wt. % $Na_2O$. Finally, with the reduced sodium, a second calcination was done at 1100° F. for 2 hours in order to further stabilize the catalyst and reduce unit cell size. The catalyst composition is further impregnated with 3000 ppm each of nickel and vanadium and aged under cyclic reducing and oxidizing conditions in the presence of steam at between 1350-1500° F. The catalytic activity and selectivity of the catalyst composition is determined using Advanced Cracking Evaluation (ACE) reactors and protocols.

Example 4

A catalyst composition as described in Example 1 was prepared. Particles comprising matrix material and 7 wt. % boron oxide were prepared, and these particles were mixed with the catalyst composition described in Example 1 in a ratio of 5% boron oxide particles and 95% of the catalyst composition of Example 1 to provide a catalyst composition comprising 0.35 wt. % of a boron component on an oxide basis.

ACE results at constant conversion (75 wt. %) of the four catalyst examples:

| | Comp. Example 3 | Example 4 |
|---|---|---|
| H2 | 0.81 | 0.59 |
| Gasoline + LPG | 57.86 | 61.55 |
| LCO | 15.12 | 14.86 |
| Coke | 13.49 | 10.44 |
| Activity at C/O = 7.7 | 3.57 | 3.76 |

Example 4 exhibited the lowest coke yield in the table above, and considerably lower $H_2$ yield compared to Comparative Example 3.

All references, including publications, patent applications, and patents, cited herein are hereby incorporated by reference for all purposes to the same extent as if each reference were individually and specifically indicated to be incorporated by reference and were set forth in its entirety herein.

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments,"

"in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A fluid catalytic cracking (FCC) catalyst composition for cracking hydrocarbons, the FCC catalyst composition comprising FCC compatible inorganic particles comprising a non-zeolitic component, mobile boron oxide, and cracking particles, wherein the non-zeolitic component comprises an aluminosilicate; the FCC catalyst composition is effective to reduce coke and hydrogen yields during cracking of metal-containing FCC feeds compared to an FCC catalyst composition without the mobile boron oxide; and the mobile boron oxide passivates FCC feeds having a high metals content during FCC.

2. The FCC catalyst composition of claim 1, wherein the boron oxide is present from 0.005% to 8% by weight of the composition.

3. The FCC catalyst composition of claim 2, wherein the cracking particles comprise 20% to 95% by weight of a zeolite component.

4. The FCC catalyst composition of claim 1, wherein the cracking particle further comprises an oxide selected from the group consisting of yttria, ceria, lanthana, praseodymia, neodymia, and combinations thereof.

5. The FCC catalyst composition of claim 4 further comprising the lanthana, and the lanthana is present in a range of 0.5 wt. % to about 5.0 wt. % on an oxide basis based on the weight of the FCC catalyst composition.

6. The FCC catalyst composition of claim 4, the cracking particle further comprising a transition alumina component present in a range of 1 wt. % to 35 wt. %.

7. The FCC catalyst composition of claim 1, wherein the zeolite is intergrown with the non-zeolitic component.

8. The FCC catalyst composition of claim 1, wherein the zeolite component is mixed with the non-zeolitic component.

9. The FCC catalyst composition of claim 1, wherein the boron oxide is deposited on the cracking particles.

10. An FCC catalyst composition for cracking hydrocarbons, the FCC catalyst composition comprising a first particle type comprising one or more mobile boron oxide components and a first matrix component comprising an alumniosilicate and a second particle type having a composition different from the first particle type, the second particle type comprising a second matrix component and 20% to 95% by weight of a zeolite component, wherein the first particle type and second particle type are mixed together; and wherein the mobile boron oxide components passivate FCC feeds having a high metals content during FCC.

11. The FCC catalyst composition of claim 10, wherein the first and second matrix components comprise a non-zeolitic material selected from the group consisting of kaolinite, halloysite, montmorillonite, bentonite, attapulgite, kaolin, amorphous kaolin, metakaolin, mullite, spinel, hydrous kaolin, clay, titania, alumina, silica, silica-alumina, and sepiolite.

12. A method of cracking a hydrocarbon feed under fluid catalytic cracking conditions, the method comprising contacting the hydrocarbon feed with the FCC catalyst composition of claim 1.

13. A method of cracking a hydrocarbon feed under fluid catalytic cracking conditions, the method comprising contacting the hydrocarbon feed with the FCC catalyst composition of claim 10.

14. The FCC catalyst composition of claim 3, wherein the zeolite component is selected from the group consisting of zeolite X, REX, zeolite Y, Ultrastable Y, Rare Earth exchanged Y, Rare Earth exchanged USY, Dealuminated Y, Ultrahydrophobic Y, and a dealuminated silicon-enriched zeolite.

15. The FCC catalyst composition of claim 3, wherein the zeolite component is selected from the group consisting of zeolite Y, ZSM-20, ZSM-5, zeolite beta, zeolite L, faujasite, and mordenite.

16. The FCC catalyst composition of claim 3, wherein the zeolite component comprises zeolite Y.

* * * * *